United States Patent
Sarikaya et al.

(10) Patent No.: US 9,690,776 B2
(45) Date of Patent: Jun. 27, 2017

(54) CONTEXTUAL LANGUAGE UNDERSTANDING FOR MULTI-TURN LANGUAGE TASKS

(71) Applicant: Microsoft Technology Licensing, LLC, Redmond, WA (US)

(72) Inventors: Ruhi Sarikaya, Redmond, WA (US); Puyang Xu, Bellevue, WA (US); Alexandre Rochette, Montreal (CA); Asli Celikyilmaz, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 138 days.

(21) Appl. No.: 14/556,874

(22) Filed: Dec. 1, 2014

(65) Prior Publication Data

US 2016/0154792 A1 Jun. 2, 2016

(51) Int. Cl.
*G06F 17/27* (2006.01)
*G10L 15/183* (2013.01)
*G06F 17/30* (2006.01)

(52) U.S. Cl.
CPC ........ *G06F 17/2785* (2013.01); *G06F 17/279* (2013.01); *G06F 17/30976* (2013.01)

(58) Field of Classification Search
CPC ....... G10L 15/18; G10L 15/183; G10L 15/32; G10L 2015/223; G06F 17/27; G06F 17/277; G06F 17/2785
USPC .......................................... 704/9, 257, 275
See application file for complete search history.

(56) References Cited

U.S. PATENT DOCUMENTS

| | | | |
|---|---|---|---|
| 7,624,020 B2 * | 11/2009 | Yamada | G06F 17/2809 704/237 |
| 7,716,056 B2 | 5/2010 | Weng et al. | |
| 7,752,152 B2 | 7/2010 | Paek et al. | |
| 7,835,911 B2 | 11/2010 | Balchandran et al. | |
| 8,032,375 B2 | 10/2011 | Chickering et al. | |
| 8,914,396 B2 * | 12/2014 | Johnston | G06F 17/30976 704/9 |
| 9,070,366 B1 * | 6/2015 | Mathias | G06F 17/279 |

(Continued)

OTHER PUBLICATIONS

Hakkani-Tur, et al., "A Discriminative Classification-Based Approach to Information State Updates for a Multi-Domain Dialog System", In Proceedings of 13th Annual Conference of the International Speech Communication Association, Sep. 9, 2012, 4 pages.

(Continued)

*Primary Examiner* — Martin Lerner

(57) ABSTRACT

Methods and systems are provided for contextual language understanding. A natural language expression may be received at a single-turn model and a multi-turn model for determining an intent of a user. For example, the single-turn model may determine a first prediction of at least one of a domain classification, intent classification, and slot type of the natural language expression. The multi-turn model may determine a second prediction of at least one of a domain classification, intent classification, and slot type of the natural language expression. The first prediction and the second prediction may be combined to produce a final prediction relative to the intent of the natural language expression. An action may be performed based on the final prediction of the natural language expression.

20 Claims, 11 Drawing Sheets

(56) References Cited

U.S. PATENT DOCUMENTS

| | | | | |
|---|---|---|---|---|
| 9,098,494 | B2* | 8/2015 | Sarikaya | G06F 17/289 |
| 9,141,622 | B1* | 9/2015 | Moore | G06F 17/3007 |
| 2002/0111806 | A1* | 8/2002 | Franz | G10L 15/18 |
| | | | | 704/255 |
| 2012/0197825 | A1* | 8/2012 | Medlock | G06F 3/0237 |
| | | | | 706/11 |
| 2012/0253799 | A1* | 10/2012 | Bangalore | G10L 15/183 |
| | | | | 704/231 |
| 2013/0218836 | A1* | 8/2013 | Sullivan | G06Q 10/109 |
| | | | | 707/613 |
| 2013/0304451 | A1* | 11/2013 | Sarikaya | G06F 17/289 |
| | | | | 704/2 |
| 2014/0214871 | A1 | 7/2014 | Adams et al. | |
| 2014/0222422 | A1* | 8/2014 | Sarikaya | G06F 17/279 |
| | | | | 704/231 |
| 2014/0297267 | A1* | 10/2014 | Spencer | G06F 17/276 |
| | | | | 704/9 |
| 2015/0317302 | A1* | 11/2015 | Liu | G06F 17/28 |
| | | | | 704/9 |
| 2015/0340033 | A1* | 11/2015 | Di Fabbrizio | G10L 15/18 |
| | | | | 704/254 |
| 2016/0188565 | A1* | 6/2016 | Robichaud | G06F 17/278 |
| | | | | 704/9 |
| 2016/0217124 | A1* | 7/2016 | Sarikaya | G06F 17/2765 |
| 2016/0307567 | A1* | 10/2016 | Boies | G06F 17/279 |
| 2016/0328270 | A1* | 11/2016 | Bikkula | G06F 9/4881 |

OTHER PUBLICATIONS

Lee, et al., "Unsupervised Spoken Language Undestanding for a Multi-Domain Dialog System", In IEEE Transactions on Audio, Speech, and Landuage Processing, vol. 21, Issue 11, Nov. 2013, pp. 2451-2464.
Wang, et al., "A Hybrid Ontology Directed Feedback Selection Algorithm for Supporting Creative Problem Solving Dialogues", In Proceedings of the 20th International Joint Conference on Artificial Intelligence, Jan. 6, 2007, pp. 1750-1755.
Robichaud, et al., "Hypotheses Ranking for Robust Domain Classification and Tracking in Dialogue Systems", In Proceedings of the 15th Annual Conference of the International Speech Communication Association, Sep. 2014, 5 pages.
Wang, et al., "Leveraging Semantic Web Search and Browse Sessions for Multi-Turn Spoken Dialog Systems", In IEEE International Conference on Acoustics, Speech and Signal Processing, May 4, 2014, 5 pages.
Tur, et al., "Spoken Language Understanding: Systems for Extracting Semantic Information from Speech", In Proceedings of John Wiley and Sons, Apr. 25, 2011, 3 pages.
Gorin, et al., "How May I Help You?", In Journal of Speech Communication, vol. 23, Issue 1-2, Oct. 1997, 15 pages.
Vapnik, Vladimir N., "Statistical Learning Theory", In Wiley-Interscience, Sep. 30, 1998, 4 pages.
Cox, Stephen, "Discriminative Techniques in Call Routing", In Proceedings of IEEE International Conference on Acoustics, Speech, and Signal Processing, vol. 1, Apr. 6, 2003, 4 pages.
Pieraccini, et al., "A Speech Understanding System Based on Statistical Representation of Semantics", In Proceedings of IEEE International Conference on Acoustics, Speech, and Signal Processing, vol. 1, Mar. 23, 1992, 4 pages.
Kuhn, et al., "The Application of Semantic Classification Trees to Natural Language Understanding", In Journal of IEEE Transactions on Pattern Analysis and Machine Intelligence, vol. 17, Issue 5, May 1995, 12 pages.
Wang, et al., "Discriminative Models for Spoken Language Understanding", In Proceedings of International on Spoken Language Processing, Sep. 17, 2006, 4 pages.
Raymond, et al., "Generative and Discriminative Algorithms for Spoken Lanauage Understanding", In Proceedings of 8th Annual Conference of the International Speech Communication Association, Aug. 27, 2007, 4 pages.

Seneff, Stephanie, "TINA: A Natural Language System for Spoken Language Applications", In Journal of Computational Linguistics, vol. 18, No. 1, Mar. 1992, 26 pages.
Ward, et al., "Recent Improvements in the CMU Spoken Language Understanding System", In Proceedings of the Workshop on Human Language Technology, Mar. 8, 1994, 4 pages.
Miller, et al., "A Fully Statistical Approach to Natural Language Interfaces", In Proceedings of the 34th Annual Meeting on Association for Computational Linguistics, Jun. 24, 1996, 7 pages.
Levin, et al., "A Stochastic Model of Computer Human Interaction for Learning Dialogue Strategies", In Proceedings of Fifth European Conference on Speech Communication and Technology, Sep. 22, 1997, 4 pages.
Williams, et al., "Scaling up POMDPs for Dialog Management: The "Summary POMDP" Method", In Proceedings of IEEE Workshop on Automatic Speech Recognition and Understanding, Nov. 27, 2005, 6 pages.
Thomson, Blaise, "Statistical Methods for Spoken Dialogue Management", In PhD Thesis, Dec. 2009, 196 pages.
Cortes, et al., "Support-Vector Networks", In Journal of Machine Learning, vol. 20, Issue 3, Sep. 1995, 25 pages.
Fan, et al., "LIBLINEAR: A Library for Large Linear Classification", In Journal of Machine Learning Research, vol. 9, Aug. 2008, 4 pages.
Altun, et al., "Hidden Markov Support Vector Machines", In Proceedings of the Twentieth International Conference on Machine Learning, Aug. 21, 2003, 8 pages.
Bartlet, et al., "Automatic Syllabification with Structured SVMs for Letter-to-Phoneme Conversion", In Poceedings of the 46th Annual Meeting of the Association for Computational Linguistic, Jun. 2008, 9 pages.
Chang, et al., "Enhancing Domain Portability of Chinese Segmentation Model using Chi-Square Statistics and Bootstrapping", In Proceedings of the Conference on Empirical Methods in Natural Language Processing, Oct. 9, 2010, 10 pages.
Kiritchenko, et al., "Lexically-Triggered Hidden Markov Models for Clinical Document Coding", In Poceedings of the 49th Annual Meeting of the Association for Computational Linguistics, Jun. 19, 2011, 10 pages.
Verbeke, et al, "A Statistical Relational Learning Approach to Identifying Evidence Based Medicine Categories", In Proceedings of the Joint Conference on Empirical Methods in Natural Language Processing and Computational Natural Language Learning, Jul. 12, 2012, 11 pages.
Lafferty, et al., "Conditional Random Fields: Probabilistic Models for Segmenting and Labeling Sequence Data", In Proceedings of the Eighteenth International Conference on Machine Learning, Jun. 28, 2001, 10 pages.
Bottou, Leon, "Large-Scale Machine Learning with Stochastic Gradient Descent", In Proceedings of 19th International Conference on Computational Statistics, Aug. 22, 2010, 10 pages.
Bhargava, et al., "Easy Contextual Intent Prediction and Slot Detection", In IEEE Intenational Conference on Acoustics, Speech and Signal Processing, May 26, 2013, 5 pages.
Mikolov, et al., "Recurrent Neural Network Based Language Model", In Proceedings of 11th Annual Conference of the International Speech Communication Association, Sep. 26, 2010, 1 page.
Sutskever, et al., "Generating Text with Recurrent Neural Networks", In Proceedings of the 28th International Conference on Machine Learning, Jun. 28, 2011, 8 pages.
Bengio, et al., "A Neural Probabilistic Language Model", In Journal of Machine Learning Research, vol. 3, Feb. 2003, pp. 1137-1155.
Schwenk, Holger, "Continuous Space Language Models", In Proceedings of Computer Speech and Language, vol. 21, No. 3, Jul. 2007, pp. 492-518.
Yao, et al., "Recurrent Neural Networks for Language Understanding", In Proceedings of 14th Annual Conference of the International Speech Communication Association, Aug. 25, 2013, 5 pages.
Mesnil, et al., "Investigation of Recurrent-Neural-Network Architectures and Learning Methods for Spoken Language Understanding", In Proceedings of 14th Annual Conference of the International Speech Communication Association, Aug. 25, 2013, 5 pages.

(56) References Cited

OTHER PUBLICATIONS

Dahl, et al. "Context-Dependent Pre-Trained Deep Neural Networks for Large-Vocabulary Speech Recognition", In IEEE Transactions on Audio, Speech, and Language Processing, vol. 20, No. 1, Jan. 2012, pp. 30-42.
Collobert, et al., "A Unified Architecture for Natural Language Processing: Deep Neural Networks with Multitask Learning", In Proceedings of the 25th International Conference on Machine Learning, Jul. 5, 2008, 99, 160-167.
Deoras, et al., "Deep Belief Network based Semantic Taggers for Spoken Language Understanding", In Proceedings 14th Annual Conference of the International Speech Communication Association, Aug. 25, 2013, 5 pages.
Sarikaya etal "Deep Belief Nets for Natual Language Call Routing" In Poceedings of the IEEE Intenatonal Conference on Acoustics, Speech, and Signal Processing, May 22, 2011, 4 pages.
Tur, et al., "Towards Deeper Understanding:Deep Convex Networks for Semantic Utterance Classification", In IEEE International Conference on Acoustics, Speech and Signal Processing, Mar. 25, 2012, pp. 5045-5048.
Deng, et al., "Use of Kernel Deep Convex Networks and End-To-End Learning for Spoken Language Understanding", In IEEE Spoken Language Technology Workshop, Dec. 2, 2012, pp. 210-215.
Xua, et al., "Continuous Space Discriminative Language Modeling", In Proceedings of the IEEE International Conference on Acoustics, Speech, and Signal Processing, May 22, 2011, 4 pages.
Xu, et al., "Convolutional Neural Network Based Triangular Crf for Joint Intent Detection and Slot Filling", In IEEE Workshop on Automatic Speech Recognition and Understanding, Dec. 8, 2013, 6 pages.
Elman, Jeffrey L., "Finding Structure in Time", In Proceedings of Cognitive Science, vol. 14, Issue 2, Mar. 1990, pp. 179-211.
Jordan, Michael I., "Serial Order: A Parallel Distributed Processing Approach", In Proceedings of Technical TR 8604, May 1986, 46 pages.
Bengio, et al., "Scaling Learning Algorithms towards AI", In Large Scale Kernel Machines, MIT Press, Oct. 7, 2014, 41 pages.
Hinton, et al., "A Fast Learning Algorithm for Deep Belief Nets", In Journal Neural Computation, vol. 18, Issue 7, Jul. 2006, 16 pages.
Collobert, et al., "Natural Language Processing (Almost) from Scratch", In Journal of Machine Learning Research, vol. 12, Aug. 2011, pp. 2493-2537.
Hinton, et al., "Improving Neural Networks by Preventing Co-Adaptation of Feature Detectors", In Proceedings of Neural and Evolutionary Computing, Oct. 7, 2014, 18 pages.

\* cited by examiner

CONTEXTUAL LANGUAGE UNDERSTANDING FOR MULTI-TURN LANGUAGE TASKS

BACKGROUND

Language understanding applications (e.g., digital assistant applications) require at least some contextual language understanding for interpreting spoken language input. The key to success for language understanding applications is having data. However, at early stages of language understanding system development, data is usually limited, in particular, for multi-turn dialogue scenarios. Due to the lack of data, current commercial language understanding systems have limited support for multi-turn scenarios and tend to rely on deterministic rules. Consequently, as commonly known to the community, rule-based systems do not provide accurate and reliable information in multi-turn scenarios.

It is with respect to these and other general considerations that embodiments have been made. Also, although relatively specific problems have been discussed, it should be understood that the embodiments should not be limited to solving the specific problems identified in the background.

SUMMARY

In summary, the disclosure generally relates to contextual language understanding. More particularly, the disclosure relates to methods and systems for contextual language understanding. For example, a natural language expression may be received at least by a single-turn model and a multi-turn model of a statistical system. The natural language expression may include at least one of words, terms, and phrases. A first prediction of at least one of a domain classification, intent classification, and slot type of the natural language expression may be determined using the single-turn model. A second prediction of at least one of a domain classification, intent classification, and slot type of the natural language expression may be determined using the multi-turn model. The first prediction and the second prediction may be combined to produce a final prediction relative to an intent of the natural language expression. An action may be performed based on the final prediction of the natural language expression.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
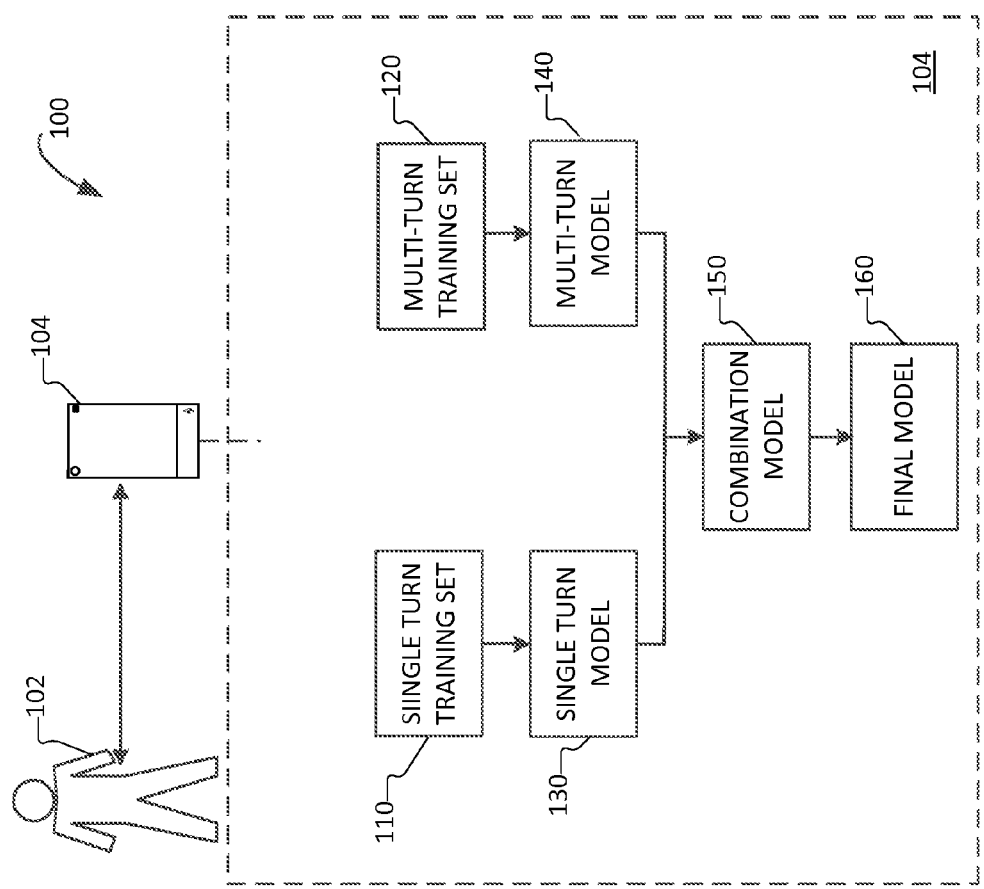
FIG. 1 illustrates an exemplary statistical system implemented at a client computing device for contextual language understanding, according to an example embodiment.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. Embodiments may be practiced as methods, systems or devices. Accordingly, embodiments may take the form of a hardware implementation, an entirely software implementation or an implementation combining software and hardware aspects. The following detailed description is therefore not to be taken in a limiting sense, and the scope of the present disclosure is defined by the appended claims and their equivalents.

The present disclosure generally relates to using contextual models for contextual language understanding in multi-turn scenarios. Existing techniques for contextual language understanding in multi-turn scenarios rely on deterministic rules and do not provide accurate and reliable information in multi-turn scenarios. For example, pre-determined rules may be written and implemented in current systems based on data (e.g., spoken language inputs) received by the system over time to determine how to respond to spoken language inputs. However, as new spoken language inputs (e.g., queries) are received and new rules are written to handle new queries, the system becomes more complex, and in some cases, may cause already existing rules to be broken. Accordingly, embodiments described herein include contextual models for supporting and/or handling complicated multi-turn scenarios in contextual language understanding. Contextual models may include a combination of statistical machine learning based techniques and rules. In some cases, statistical machine learning based techniques may include techniques such as artificial neural networks, Bayesian classifiers, and/or genetically derived algorithms. Such contextual models enable multi-turn contextual language understanding, and in particular, during early stages of language understanding system development when multi-turn data is limited and single-turn data is more abundant.

Accordingly, a flexible statistical modeling framework for multi-turn scenarios is provided without disrupting an existing single-turn model for language understanding in single-turn scenarios. In one case, single-turn may refer to a scenario where a spoken language input/natural language expression is processed in isolation during a session between a user and a statistical system. In one case, multi-turn may refer to a scenario where more than one spoken language input/natural language expression is processed during a session between a user and a statistical system. In one aspect, a session may include a conversation between a user and application (e.g., a digital assistant application) of a statistical system. The session may start when the application is activated and a user starts speaking and end when the application is de-activated.

With reference to FIG. 1, one aspect of a statistical system 100 for contextual language understanding is illustrated. In aspects, the statistical system 100 may be implemented on a client computing device 104. In a basic configuration, the client computing device 104 is a handheld computer having both input elements and output elements. The client computing device 104 may be any suitable computing device for implementing the statistical system 100 for contextual language understanding. For example, the client computing device 104 may be at least one of: a mobile telephone; a smart phone; a tablet; a phablet; a smart watch; a wearable computer; a personal computer; a desktop computer; a laptop computer; and etc. This list is exemplary only and should not be considered as limiting. Any suitable client computing device for implementing the statistical system 100 for contextual language understanding may be utilized.

In aspects, the statistical system 100 may include a single-turn training set 110, a multi-turn training set 120, a single-turn model 130, a multi-turn model 140, a combination model 150, and a final model 160. The various components may be implemented using hardware, software, or a combination of hardware and software. The statistical system 100 may be configured to process natural language expressions. In this regard, the statistical system 100 may facilitate contextual language understanding in multi-turn scenarios. For example, the statistical system 100 may use contextual information for facilitating contextual language understanding in multi-turn scenarios. In aspects, contextual information may include information extracted from each turn in a session. For example, the information extracted may include a domain prediction, an intent prediction, and slot types predicted (e.g., the results) from a previous turn (e.g., a previous natural language expression/request from the current session). In another case, the contextual information may include the response to a previous turn by the statistical system 100. For example, the response to a previous turn may include how the statistical system 100 responded to the previous request from a user (e.g., what the statistical system output/said to the user), items located on a display of the client computing device 104, text located on the display of the client computing device 104, and the like. In another case, the contextual information may include client context. For example, client context may include a contact list on the client computing device 104, a calendar on the client computing device 104, GPS information (e.g., a location of the client computing device 104), the current time (e.g., morning, night, in a meeting, in a workout, driving, etc.), and the like. In another case, the contextual information may include knowledge content. For example, knowledge content may include a knowledge database that maps features from the natural language expression with stored data. As an example, "John Howie" may be mapped to a restaurant in the knowledge database. In yet another case, the contextual information includes any combination of the above-discussed contextual information.

In one example, a natural language expression may include phrases, words, and/or terms in the form of a spoken language input (e.g., a user query and/or request). In another example, a natural language expression may include phrases, words, and/or terms in the form of a textual language input (e.g., a user query and/or request). In this regard, the natural language expression may be ambiguous and/or have missing information. For example, the natural language expression, "how about tomorrow," is ambiguous when analyzed in isolation. In one aspect, a multi-turn scenario is a scenario where more than one spoken language input/natural language expression is processed during a session between a user 102 and the statistical system 100. In some cases, each natural language expression may be interpreted as a turn during a session. In some cases, a turn may include both the natural language expression and a response/action by the statistical system 100. That is, a first turn may include both a natural language expression and a response/action by the statistical system 100. In other aspects, a multi-turn scenario indicates that information from each turn of the session is utilized to make a prediction. In one aspect, a session may include a conversation between a user and application (e.g., a digital assistant application) of the statistical system 100. The session may start when the application is activated and a user starts speaking and end when the application is de-activated.

In one aspect, the single-turn training set 110 may include data that has been developed over time (e.g., based on an analysis of a large collection of natural language expressions). In one aspect, the data may be user data based on receiving a large collection of natural language expressions from users over time. In other aspects, the data may be data from third party sources such as crowdsourcing and/or service logs of an existing rule-based system, for example. The single-turn training set 110 may be configured to train the single-turn model 130. For example, the single-turn model 130 may be built by using data from the single-turn training set 110. In this regard, the single-turn model 130 may include standard spoken language understanding models such as support vector machines, conditional random fields and/or convolutional non-recurrent neural networks for training purposes. One skilled in the art would recognize the basics of the standard language understanding models such as the support vector machines, conditional random fields, and convolutional neural networks. In this regard, the single-turn model 130 may be configured to perform domain and intent prediction (e.g., using the support vector machines) and slot tagging (e.g., using conditional random fields), which will be described in detail below relative to FIG. 3. In one aspect, the single-turn model 130 is configured to determine predictions for single-turn scenarios. A single-turn scenario may be a scenario where a spoken language input/natural language expression is processed in isolation during a session between a user and the statistical system 100. A single-turn scenario may indicate that only information from the currently processed natural language expression is utilized to make a prediction.

In one aspect, the multi-turn training set 120 may include data from third party sources such as crowdsourcing and/or service logs of an existing rule-based system, for example. In one case, after developing the multi-turn training set 120 over time (e.g., after an analysis of a large collection of natural language expressions), the multi-turn training set 120 may include user data based on receiving a large collection of natural language expressions from users over time. The multi-turn training set 120 may be configured to train the multi-turn model 140. For example, the multi-turn model 140 may be built by using the multi-turn training set 120. In this regard, the multi-turn model 140 may include standard spoken language understanding models such as support vector machines, conditional random fields and/or convolutional recurrent neural networks for training purposes. In this regard, the multi-turn model 140 may be configured to perform domain and intent prediction (e.g., using the support vector machines) and slot tagging (e.g., using conditional random fields), which will be described in detail below relative to FIG. 3. In one aspect, the multi-turn model 140 is configured to determine predictions for multi-turn scenarios. For example, as discussed above, a multi-turn scenario may be a scenario where more than one spoken language input/natural language expression is processed during a session between a user 102 and the statistical system 100 and/or where information from each turn of the session is utilized to make a prediction.

As discussed above, both the single-turn model 130 and the multi-turn model 140 may determine predictions regarding domain and/or intent of a natural language expression. Both the single-turn model 130 and the multi-turn model 140 may calculate a score for the determined predictions. In one case, the score may be calculated as a dot product between a feature vector and its corresponding weight vector. The score may represent a level of confidence in the determined prediction. For example, the single-turn model 130 may calculate a score of 0.6 for a calendar domain prediction of a natural language expression and the multi-turn model 140 may calculate a score of 0.4 for a calendar domain prediction. That is, in this example, both the single-turn model 130 and the multi-turn model 140 may predict a domain of "calendar" and calculate a different score (e.g., a probability) that the domain is what is predicated, in this case, a calendar domain. In turn, the predictions determined by both the single-turn model 130 and the multi-turn model 140 may be sent to the combination model 150 for processing.

In one aspect, the combination model 150 may be configured to assign weights to each of the single-turn model 130 and the multi-turn model 140 and combine the predictions (e.g., the calculated scores) from the single-turn model 130 and the multi-turn model 140 utilizing the assigned weights to produce a final prediction. In one example, the combination model 150 may use linear interpolation to combine the predictions from the single-turn model 130 and the multi-turn model 140. The weights may be determined and assigned to the single-turn model 130 and the multi-turn model 140 by measuring the accuracy on a development set of data with different weights. In this regard, the weight that generates the highest accuracy is chosen to be the operating point. In one case, the operating point indicates a level of confidence in the determined predictions of the single-turn model 130 and the multi-turn model 140. Alternatively, the weight may be learned from a development set of data in an expectation maximization fashion such that the weight is treated as a hidden variable. In some cases, at least one model may be built to determine the weights for the single-turn model 130 and the multi-turn model 140. The model may be built using the natural language expression and/or contextual information. One skilled in the art would recognize the basics of the linear interpolation technique utilized by the combination model 150 for assigning a weight to each of the single-turn model 130 and the multi-turn model 140 and, in turn, combining the predictions from the single-turn model 130 and the multi-turn model 140.

In one aspect, the final prediction may be sent to the final model 160. In this regard, the final model 160 may be configured to receive final predictions from the combination model 150 and perform an action based on the final prediction. For example, an action may include responding to the user's 102 natural language expression. The response may include an answer to the natural language expression based on the final prediction of the ultimate goal of the user 102. For example, if the natural language expression includes a request for driving directions, the action/answer may include providing driving directions to the user 102 based on the final prediction. In another example, the response may include a question to the user 102. For example, if the natural language query includes a request to create a meeting, the response may be "for what time." In other cases, the action may include performing a task. For example, the action may include creating a calendar event, sending a text message, setting a reminder, performing a query using a search engine (e.g., Bing, Google, Yahoo), and the like.

Figure 2:
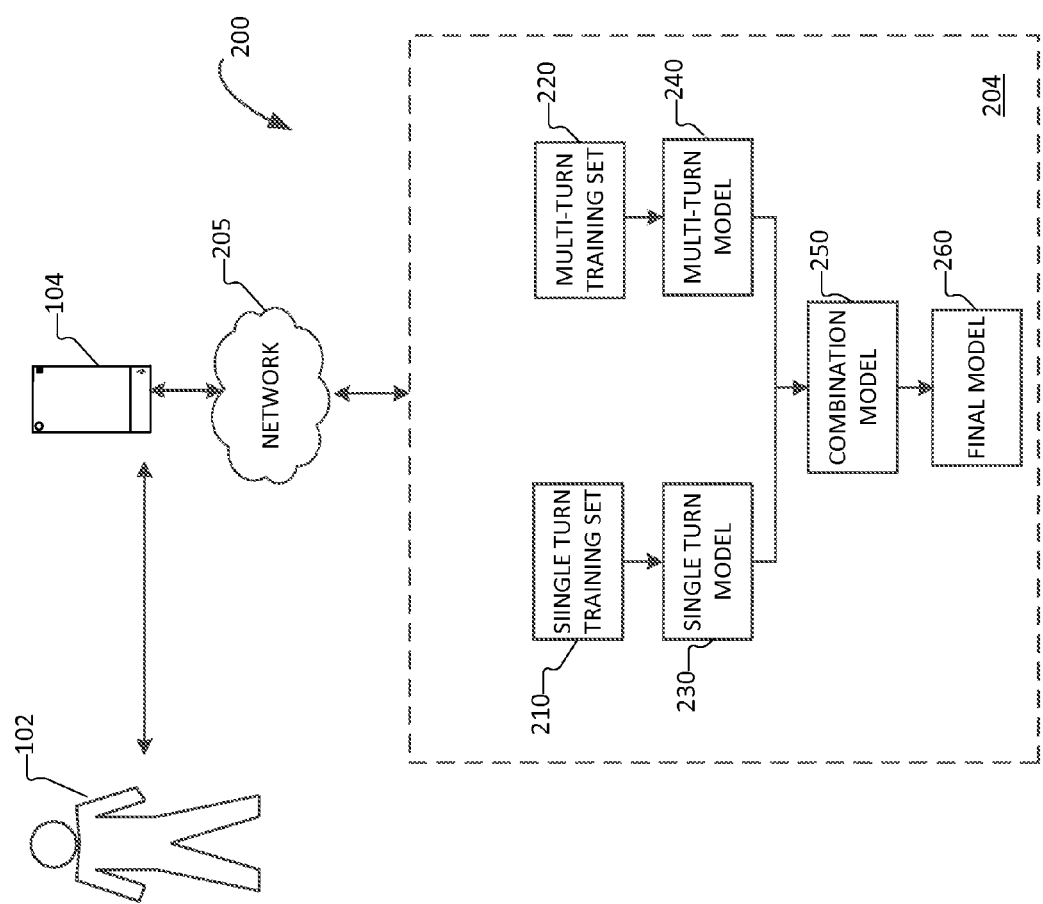
FIG. 2 illustrates an exemplary statistical system implemented at a server computing device for contextual language understanding, according to an example embodiment.

FIG. 2 illustrates a statistical system 200 for contextual language understanding according to one or more aspects. In aspects, the statistical system 200 may be implemented on a server computing device 204. The server computing device 204 may provide data to and from the client computing device 104 through a network 205. In one aspect, the network 205 is a distributed computing network, such as the internet. In aspects, that statistical system 200 may be implemented on more than one server computing device 204, such as a plurality of server computing devices 204. As shown in FIG. 2, the statistical system 200 may include a single-turn training set 210, a multi-turn training set 220, a single-turn model 230, a multi-turn model 240, a combination model 250, and a final model 260. The statistical system 200 may be configured to process natural language expressions. In this regard, the statistical system 200 may facilitate contextual language understanding in multi-turn scenarios. The single-turn training set 210, the multi-turn training set 220, the single-turn model 230, the multi-turn model 240, the combination model 250, and the final model 260 may be configured similar to the single-turn training set 110, the multi-turn training set 120, the single-turn model 130, the multi-turn model 140, the combination model 150, and the final model 160 described above relative to FIG. 1. In this regard, the statistical system 200 may include all the functionality described in the above aspects relative to the statistical system 100 of FIG. 1.

As discussed above, the server computing device 204 may provide data to and from the client computing device 104 through the network 205. The data may be communicated over any network suitable to transmit data. In some aspects, the network 205 is a computer network such as the internet. In this regard, the network 205 may include a Local Area Network (LAN), a Wide Area Network (WAN), the Internet, wireless and wired transmission mediums. In this regard, the natural language expression may be received at the client computing device 104 and transmitting over the network 205 for processing by the statistical system 200 at the server computing device 204. It is appreciated that the statistical system 100/200 components (e.g., to the single-turn training set 110/210, a multi-turn training set 120/220, a single-turn model 130/230, a multi-turn model 140/240, a combination model 150/250, and a final model 160/260) may be located at the client computing device 104, the server computing device 204, and/or both the client computing device 104 and the server computing device 204 in any combination. For example, in one aspect, the client computing device 104 may include the single-turn training set 110 and the multi-turn training set 120 and the server computing device 204 may include the single-turn model 230, the multi-turn model 240, the combination model 250, and the final model 260 in one configuration. This is exemplary only and should not be considered as limiting. Any suitable combination of statistical system components at the client computing device 104 and the server computing device 204 for contextual language understanding may be utilized.

Figure 3:
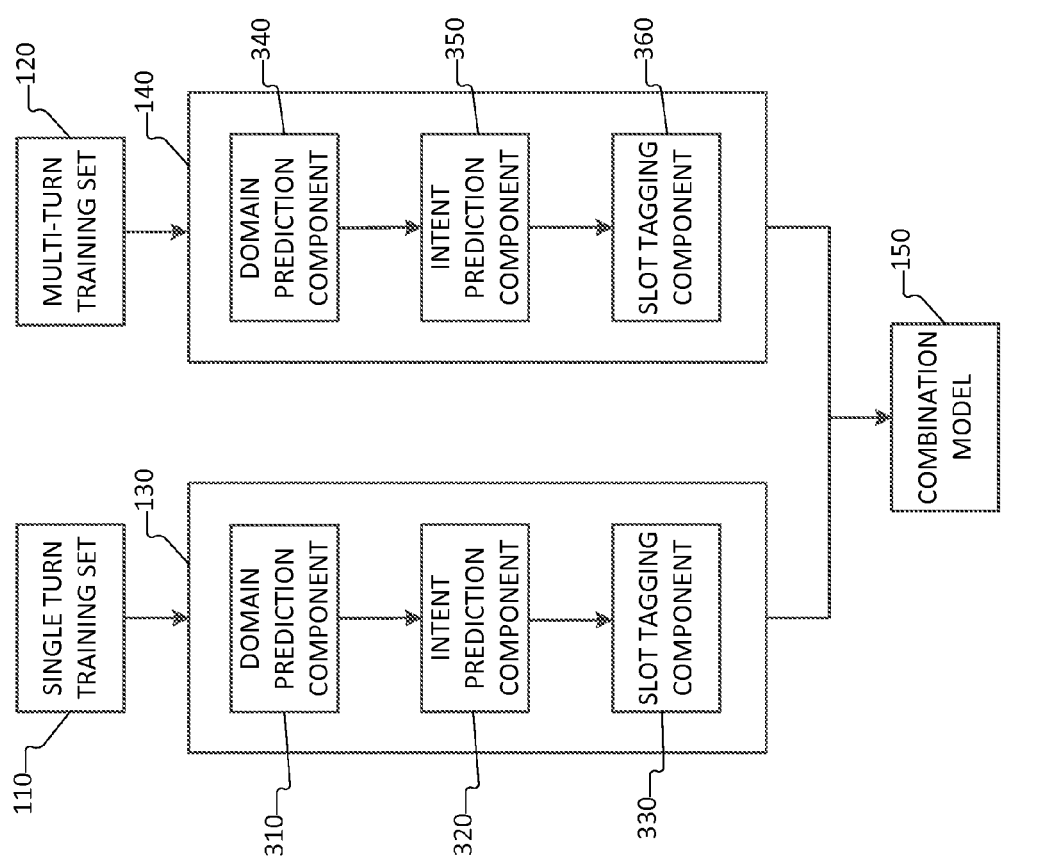
FIG. 3 illustrates an exemplary block diagram of a single-turn model and a multi-turn model for contextual language understanding, according to an example embodiment.

FIG. 3 illustrates an exemplary block diagram of a single-turn model 130 and a multi-turn model 140 for contextual language understanding, according to one or more aspects of the present disclosure. As discussed above, both the single-turn model 130 and the multi-turn model 140 may be configured to perform domain and intent prediction (e.g., using the support vector machines) and slot tagging (e.g., using conditional random fields), for example. In this regard, as illustrated in FIG. 3, the single-turn model 130 may include a domain prediction component 310, an intent detection component 320, and a slot tagging component 330. As discussed above, the domain prediction component 310 may be any standard domain classification component used in language understanding such as support vector machines. In this regard, the domain prediction component 310 may be configured to classify the natural language expression into a supported domain of the single-turn model 130. Domain may refer to generally known topics such as places, reminder, calendar, weather, communication, and the like.

In one aspect, when the single-turn model 130 receives the natural language expression, the domain prediction component 310 may evaluate the natural language expression in isolation (e.g., the domain prediction component 310 may utilize only the information provided in the natural language expression to classify the natural language expression into a supported domain of the single-turn model 130). For example, in the natural language expression, "show me driving directions to Portland," the domain prediction component 310 may extract the feature, "Portland" and classify the natural language expression into the supported domain, "Places," of the single-turn model 130. Additionally, the domain prediction component 310 may calculate a score indicative of the probability that the natural language expression, "show me driving directions to Portland," should in fact be classified into the "Places" domain.

In one aspect, after the domain prediction component 310 classifies the natural language expression into a supported domain of the single-turn model 130, the intent prediction component 320 may process the natural language expression. As discussed above, the intent prediction component 320 may be any standard intent prediction component used in language understanding such as support vector machines. In this regard, the intent prediction component 320 may be configured to determine intent of the user 102 via the natural language expression. As such, the intent prediction component 320 may process the natural language expression in isolation. For example, in the natural language expression, "show me driving directions to Portland," the intent prediction component 320 may determine that the intent of the user 102 is an intent classification such as, for example "get_route." Additionally, the intent prediction component 320 may calculate a score indicative of the probability that the intent of the user 102 via the natural language expression, "show me driving directions to Portland," is in fact a "get_route" intent classification.

In one aspect, after the domain prediction component 310 classifies the natural language expression into a supported domain of the single-turn model 130 and the intent prediction component 320 determines a prediction for the intent of the user 102, the slot tagging component 330 may process the natural language expression. As discussed above, the slot tagging component 330 may be any standard slot tagging component used in language understanding such as conditional random fields. In this regard, the slot tagging component 330 may be configured to perform slot detection on the natural language expression. In one case, slot detection may include filling slot types (e.g., slot types supported by the single-turn model 130) with semantically loaded words from the natural language expression. In one aspect, the slot tagging component 330 may process the natural language expression in isolation. For example, in the natural language expression, "from 2 pm to 4 pm," the slot tagging component 330 may fill the slot type "start_time" with "2 pm" and the slot type "end_type" with "4 pm." Additionally, the slot tagging component 330 may calculate a score indicative of the probability that the slot type is in fact correct.

As discussed above, the components of the single-turn model 130 may process the natural language expression in isolation. In this regard, only the currently processed natural language expression is utilized to make predictions and calculate scores. This concept will be demonstrated in the examples described hereafter. In a first example, a first turn of a session may include the natural language expression, "how is the weather tomorrow." In this example, the domain prediction component 310 may predict the domain classification as "Weather." A second turn of the same session may include the natural language expression, "how about this weekend." In a second session, the first turn may include the natural language expression, "what does my schedule look like today." In this example, the domain prediction component 310 may predict the domain classification as "Calendar." A second turn of the second session may include the natural language expression, "how about this weekend." In the first example described above, the single-turn model 130 may not be able to accurately predict the domain classification of the natural language expression, "how about this weekend," when evaluated in isolation.

In a second example, a first turn of a session may include the natural language expression, "show me driving directions to Portland." In this example, the domain prediction component 310 may predict the domain classification as "Places," and the intent prediction component 320 may predict the intent classification of the user as "get_route." A second turn of the same session may include the natural language expression, "how about Vancouver." In a second session, the first turn may include the natural language expression, "show me highly rated Chinese restaurants in Seattle." In this example, the domain prediction component 310 may predict the domain classification as "Places," and the intent prediction component 320 may predict the intent classification of the user 102 as "find_place." A second turn of the second session may include the natural language expression, "how about Vancouver." In the second example described above, the single-turn model 130 may not be able to accurately predict the intent classification of the user via the natural language expression, "how about Vancouver," when evaluated in isolation.

In a third example, a first turn of a session may include the natural language expression, "create a meeting with Jason." In this example, the domain prediction component 310 may predict the domain classification as "Calendar," and the intent prediction component 320 may predict the intent classification of the user 102 as "create_meeting." A second turn of the same session may include the natural language expression, "from 2 pm to 4 pm." In a second session, the first turn may include the natural language expression, "postpone the meeting with Jason." In this example, the domain prediction component 310 may predict the domain classification as "Calendar," and the intent prediction component 320 may predict the intent classification of the user as "change_meeting." A second turn of the second session may include the natural language expression, "from 2 pm to 4 pm." In the third example described above, the single-turn model 130 may not be able to accurately identify the slot types of the natural language expression, "from 2 pm to 4 pm," when evaluated in isolation.

As illustrated in the three examples described above, when natural language expressions are evaluated in isolation, errors may be made by any of the domain prediction component 310, the intent prediction component 320, and the slot tagging component 330. Further, errors made earlier in the language understanding processing (e.g., errors made by the domain prediction component 310) may often lead to incorrect language understanding responses/actions. In this regard, the statistical system 100/200 of the present disclosure evaluates the currently processed natural language expression (e.g., utilizing the single-turn model 130) and both the currently processed natural language expression and contextual information from the currently processed natural language expression (e.g., utilizing the multi-turn model 140) to reduce the overall error of language understanding systems.

As illustrated in FIG. 3, the multi-turn model 140 may include a domain prediction component 340, an intent detection component 350, and a slot tagging component 360. The various components may be implemented using hardware, software, or a combination of hardware and software. In some cases, the domain prediction component 350 may include any standard domain classification component used in language understanding such as support vector machines. In other cases, the domain prediction component 340 may include a recurrent convolutional neural network. In this regard, the domain prediction component 340 may be configured to classify the natural language expression into a supported domain of the multi-turn model 140.

In one aspect, when the multi-turn model 140 receives the natural language expression, the domain prediction component 340 may evaluate the natural language expression using information from the currently processed natural language expression and contextual information from the currently processed natural language expression. As discussed above, contextual information may include information extracted from each turn in a session. For example, the information extracted may include the domain prediction, the intent prediction, and slot types predicted (e.g., the results) from a previous turn (e.g., a previous natural language expression/request from the current session). In another case, the contextual information may include the response to a previous turn by the statistical system 100. For example, the response to a previous turn may include how the statistical system 100 responded to the previous request from a user (e.g., what the statistical system output/said to the user), items located on a display of the client computing device 104, text located on the display of the client computing device 104, and the like. In another case, the contextual information may include client context. For example, client context may include a contact list on the client computing device 104, a calendar on the client computing device 104, GPS information (e.g., a location of the client computing device 104), the current time (e.g., morning, night, in a meeting, in a workout, driving, etc.), and the like. In another case, the contextual information may include knowledge content. For example, knowledge content may include a knowledge database that maps features from the natural language expression with stored data. As an example, "John Howie" may be mapped to a restaurant in the knowledge database. In yet another case, the contextual information includes any combination of the above-discussed contextual information.

Using the same example described above relative to the single-turn model 130, a first turn of a session may include the natural language expression, "how is the weather tomorrow." In this example, the domain prediction component 340 may predict the domain classification as "Weather." A second turn of the same session may include the natural language expression, "how about this weekend." In this example, the domain prediction component 340 may predict the domain classification as "Weather." For example, the domain prediction component 340 may evaluate the first turn, "how is the weather tomorrow" and the first turn predicted domain classification "Weather," to predict the domain classification of the second turn, "how about this weekend." In this regard, based on the first turn of the same session being a request about the weather and having a "Weather" domain classification, the multi-turn model 340 may predict that the expression "how about this weekend" is related to the first expression "how is the weather tomorrow," and therefore classify the domain as "Weather."

In a second session, the first turn may include the natural language expression, "what does my schedule look like today." In this example, the domain prediction component 310 may predict the domain classification as "Calendar." A second turn of the second session may include the natural language expression, "how about this weekend." In this example, the domain prediction component 340 may predict the domain classification as "Calendar." For example, the domain prediction component 340 may evaluate the first turn, "what does my schedule look like today" and the first turn predicted domain classification "Calendar," to predict the domain classification of the second turn, "how about this weekend." In this regard, based on the first turn of the same session being a request about a schedule and having a "Calendar" domain classification, the multi-turn model 340 may predict that the expression "how about this weekend" is related to the first expression "what does my schedule look like today," and therefore classify the domain as "Calendar."

As illustrated, the multi-turn model 140 uses contextual information from the first turn in the first session to predict that the second turn in the first session, "how about this weekend," is the domain classification "Weather." Additionally, the multi-turn model 140 uses contextual information from the first turn in the second session to predict that the second turn in the second session, "how about this weekend," is the domain classification "Calendar." In this regard, the same natural language expression, "how about this weekend," may be interpreted/predicted differently in different domains by using contextual information extracted from a previous turn in a session.

In aspects, the domain prediction component 340 may calculate a score indicative of the probability that the natural language expression, "how is the weather tomorrow," should in fact be classified into the "Weather" domain and the natural language expression, "how about this weekend," in the first session should in fact be classified into the "Weather" domain. In other aspects, the domain prediction component 340 may calculate a score indicative of the probability that the natural language expression, "what does my schedule look like today," should in fact be classified into the "Calendar" domain and the natural language expression, "how about this weekend," in the second session should in fact be classified into the "Calendar" domain.

In one aspect, after the domain prediction component 340 classifies the natural language expression and/or a plurality of natural language expressions into a supported domain of the multi-turn model 140, the intent prediction component 350 may process the natural language expression. In one aspect, the intent prediction component 350 may be any standard intent prediction component used in language understanding such as support vector machines. In other aspects, the intent prediction component 350 may include a recurrent convolutional neural network. In this regard, the intent prediction component 350 may be configured to determine intent of the user 102 via the natural language expression. As such, the intent prediction component 350 may process the natural language expression using contextual information.

Using the same example described above relative to the second example of the single-turn model 130, a first turn of a session may include the natural language expression, "show me driving directions to Portland." In this example, the domain prediction component 340 may predict the domain classification as "Places," and the intent prediction component 350 may predict the intent classification of the user as "get_route." A second turn of the same session may include the natural language expression, "how about Vancouver." In this example, the domain prediction component 340 may predict the domain classification as "Places," and the intent prediction component 350 may predict the intent classification of the user as "get_route." In a second session, the first turn may include the natural language expression, "show me highly rated Chinese restaurants in Seattle." In this example, the domain prediction component 340 may predict the domain classification as "Places," and the intent prediction component 350 may predict the intent classification of the user as "find_place." A second turn of the second session may include the natural language expression, "how about Vancouver." In this example, the domain prediction component 340 may predict the domain classification as "Places," and the intent prediction component 350 may predict the intent classification of the user as "find_place."

As illustrated, the multi-turn model 140 uses contextual information from the first turn in the first session to predict the intent classification of the user 102 from the second turn in the first session, "how about Vancouver," as "get_route." Additionally, the multi-turn model 140 uses contextual information from the first turn in the second session to predict the intent classification of the user 102 from the second turn in the second session, "how about Vancouver," as "find_place." In this regard, the intent for the same natural language expression, "how about Vancouver," may be interpreted/predicted differently within the same domain (e.g., in both sessions the domain was predicted to be "Places") by using contextual information extracted from a previous turn in a session.

Additionally, the intent prediction component 350 may calculate a score indicative of the probability that the intent classification of the user via the natural language expression, "show me driving directions to Portland," is in fact "get_route" and the intent classification of the user via the natural language expression, "how about Vancouver," in the first session is in fact "get_route." In other aspects, the intent prediction component 350 may calculate a score indicative of the probability that the intent classification of the user 102 via the natural language expression, "show me highly rated Chinese restaurants in Seattle," is in fact "find_place" and the intent classification of the user 102 via the natural language expression, "how about Vancouver," in the second session is in fact "find_place."

In one aspect, after the domain prediction component 340 classifies the natural language expression into a supported domain of the multi-turn model 140 and the intent prediction component 350 determines a prediction for the intent of the user 102, the slot tagging component 360 may process the natural language expression. In one aspect, the slot tagging component 360 may be any standard slot tagging component used in language understanding such as conditional random fields. In other aspects, the slot tagging component 360 may include a recurrent convolutional neural network. In this regard, the slot tagging component 360 may be configured to perform slot detection on the natural language expression. In one case, slot detection may include filling slot types (e.g., slot types supported by the multi-turn model 140) with semantically loaded words (e.g., semantic words) from the natural language expression. In one aspect, the slot tagging component 360 may process the natural language expression using contextual information, which is described below.

Using the same example described above relative to the third example of the single-turn model 130, a first turn of a session may include the natural language expression, "create a meeting with Jason." In this example, the domain prediction component 340 may predict the domain classification as "Calendar," and the intent prediction component 350 may predict the intent classification of the user 102 as "create_meeting." A second turn of the same session may include the natural language expression, "from 2 pm to 4 pm." In this example, the domain prediction component 340 may predict the domain classification as "Calendar," and the slot tagging component 360 may predict the slot types as "start_time=2 pm" and "end_time=4 pm." In a second session, the first turn may include the natural language expression, "postpone the meeting with Jason." In this example, the domain prediction component 340 may predict the domain classification as "Calendar," and the intent prediction component 350 may predict the intent classification of the user 102 as "change_meeting." A second turn of the second session may include the natural language expression, "from 2 pm to 4 pm." In this example, the domain prediction component 340 may predict the domain classification as "Calendar," and the slot tagging component 360 may predict the slot types as "original_start_time=2 pm" and "start_time=4 pm."

As illustrated, the multi-turn model 140 uses contextual information from the first turn in the first session to predict the slot type for the second turn in the first session "from 2 pm to 4 pm" as "start_time=2 pm" and "end_time=4 pm." Additionally, the multi-turn model 140 uses contextual information from the first turn in the second session to predict the slot type for second turn in the second session "from 2 pm to 4 pm" as "original_start_time=2 pm" and "start_time=4 pm." In this regard, the slot types for the same natural language expression, "from 2 pm to 4 pm," may be interpreted/predicted differently within the same domain (e.g., in both sessions the domain was predicted to be "Calendar") by using contextual information extracted from a previous turn in a session. Additionally, the slot tagging component 360 may calculate a score indicative of the probability that the slot types for the second turn in the first session "from 2 pm to 4 pm" is in fact "start_time=2 pm" and "end_time=4 pm." Additionally, the slot tagging component 360 may calculate a score indicative of the probability that the slot types for the second turn in the second session "from 2 pm to 4 pm" is in fact "original_start_time=2 pm" and "start_time=4 pm."

In other aspects, as discussed above, the contextual information may include the response/action by the statistical system 100 after processing the natural language expression in addition to information from prior turns of a session. In one example, the first turn of a session may include the natural language expression "send a text message." The response/action by the statistical system 100 after processing the natural language expression (e.g., as described above) may be, "and say what." In this regard, the second turn of the session may include a natural language expression such as, "what will the weather be like tomorrow." The statistical system 100 may use the system response "and say what" in addition to information from the first turn in the session (e.g., predicting the slot type to be "text_message" from the "send a text message" expression) to determine that the ultimate goal and/or intent of the user 102 is to send a text message asking what the weather will be like rather than incorrectly predicting the natural language expression "what will the weather be like tomorrow," to be a weather request for the statistical system 100.

As discussed above, the components of the multi-turn model 140 may process the natural language expression using contextual information. In this regard, the multi-turn training set 120 may be developed over time and the multi-turn model 140 may be trained over time. For example, as the multi-turn model 140 processes sessions, the contextual information derived and/or learned from each session may be aggregated into the multi-turn training set 120 and ultimately the multi-turn model 140. In this regard, as discussed above, the multi-turn training set 120 may initially have a smaller data set than the single-turn training set 110 but may develop a larger data set over time. In this regard, in some aspects, the weight assigned to the single-turn model 130 may be greater than the weight assigned to the multi-turn model 140. In other aspects, the weight assigned to the single-turn model 130 may be 1 and the weight assigned to the multi-turn model 140 may be 0. As such, in this case, the statistical system 100 may process the natural language expression using only the single-turn model 130. In some cases, as more data is provided and developed for training the multi-turn model 140, the multi-turn model 140 may be assigned a greater weight than the single-turn model 130. In some cases, the statistical system 100 may process the natural language expression using only the multi-turn model 140.

In yet other cases, the statistical system 100 may include a single model for processing the natural language expression. As such, the single model may include the functionality of at least both the single-turn model 130 and the multi-turn model 140, as described herein. For example, a single model may process the natural language expression and determine predictions for both single-turn scenarios and multi-turn scenarios. In this regard, the single turn model may process a natural language expression both in isolation and using contextual information. As such, the single model may determine a first prediction and a second prediction regarding the intent of a user. In other cases, the single model may determine only a single prediction regarding the intent of a user. In some cases, the single model may include the functionality of the combination model 150 and the final model 160. It is appreciated that any combination of the components and their corresponding functionality described herein may be implemented in a single model or in multiple models to determine the intent and/or ultimate goal of a user of a digital assistant application, for example.

Figure 4:
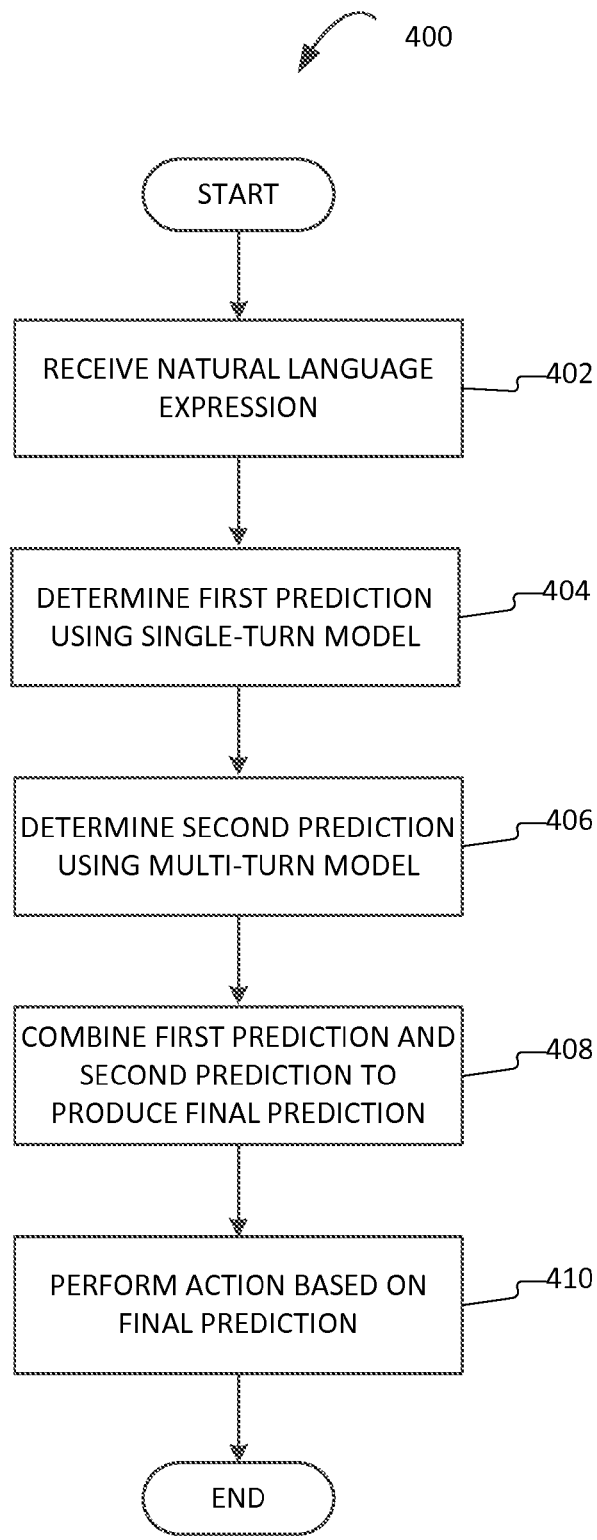
FIG. 4 illustrates an exemplary method for contextual language understanding, according to an example embodiment.

FIG. 4 illustrates a method for contextual language understanding according to one or more embodiments of the present disclosure. Method 400 begins at operation 402 where a natural language expression is received. For example, the natural language expression may be received by both a single-turn model and a multi-turn model of the statistical system for processing to determine the intent and/or ultimate goal of a user of a digital assistant application, for example. In one example, a natural language expression may include phrases, words, and/or terms in the form of a spoken language input (e.g., a user query and/or request). In this regard, the natural language expression may be ambiguous and/or have missing information. For example, the natural language expression, "how about tomorrow," is ambiguous when analyzed in isolation.

When a natural language expression is received at the statistical system, flow proceeds to operation 404 where a first prediction is determined using the single-turn model. For example, the single-turn model may include standard spoken language understanding models such as support vector machines, conditional random fields and/or convolutional non-recurrent neural networks for training purposes. In this regard, the single-turn model may be configured to perform domain and intent prediction (e.g., using the support vector machines) and slot tagging (e.g., using conditional random fields). In one aspect, the single-turn model is configured to determine predictions for single-turn scenarios. A single-turn scenario may be a scenario where a spoken language input/natural language expression is processed in isolation during a session between a user and the statistical system. A single-turn scenario may provide an indication that only information from the currently processed natural language expression is utilized to make a prediction.

When a natural language expression is received at the statistical system, flow proceeds to operation 406 where a second prediction is determined using the multi-turn model. In this regard, the same natural language expression may be received at both the single-turn model and the multi-turn model for processing. In one example, the multi-turn model may include standard spoken language understanding models such as support vector machines, conditional random fields and/or convolutional recurrent neural networks for training purposes. In this regard, the multi-turn model may be configured to perform domain and intent prediction (e.g., using the support vector machines) and slot tagging (e.g., using conditional random fields). In one aspect, the multi-turn model is configured to determine predictions for multi-turn scenarios. For example, a multi-turn scenario may be a scenario where more than one spoken language input/natural language expression is processed during a session between a user and the statistical system and/or where information from each turn of the session is utilized to make a prediction.

At operation 408, the first prediction from the single-turn model and the second prediction from the multi-turn model may be combined to produce a final prediction. For example, after the single-turn model and the multi-turn model determine predictions for the natural language expression, the prediction from each model may be sent to a combination model. In one aspect, the combination model may be configured to assign weights to each of the single-turn model and the multi-turn model and combine the predictions (e.g., the calculated scores) from the single-turn model and the multi-turn model utilizing the assigned weights to produce a final prediction. In one example, the combination model may use linear interpolation to combine the predictions from the single-turn model and the multi-turn model. The weights may be determined and assigned to the single-turn model and the multi-turn model by measuring the accuracy on a development set of data with different weights. In this regard, the weight that generates the highest accuracy is chosen to be the operating point. Alternatively, the weight may be learned from a development set of data in an expectation maximization fashion such that the weight is treated as a hidden variable.

When the final prediction is determined, flow proceeds to operation 410 where an action based on the final prediction is performed. In one aspect, the final prediction may be sent to a final model. In this regard, the final model may be configured to receive final predictions from the combination model and perform an action based on the final prediction. For example, an action may include responding to the natural language expression of a user. The response may include an answer to the natural language expression based on the final prediction of the ultimate goal of the user. For example, if the natural language expression includes a request for driving directions, the action/answer may include providing driving directions to the user based on the final prediction. In another example, the action/answer may include initiating an application (e.g., a map application) and providing commands/input to the application. In yet another example, the response may include a question to the user. For example, if the natural language query includes a request to create a meeting, the response may be "for what time." In other cases, the action may include performing a task. For example, the action may include creating a calendar event, sending a text message, setting a reminder, performing a query using a search engine (e.g., Bing), and the like.

Figure 5:
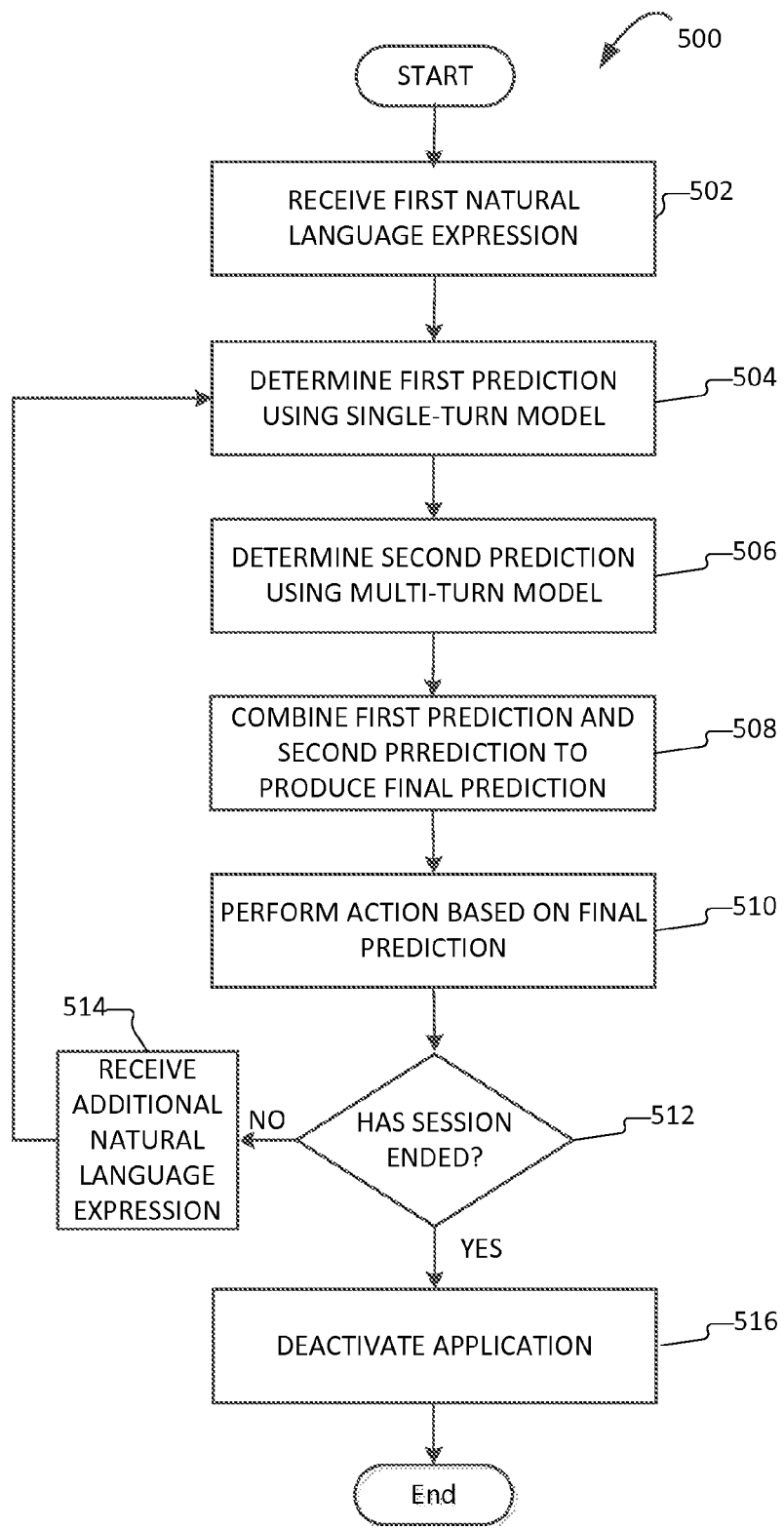
FIG. 5 illustrates an exemplary method for contextual language understanding in a multi-turn scenario, according to an example embodiment.

FIG. 5 illustrates a method for contextual language understanding in a multi-turn scenario, according to one or more embodiments of the present disclosure. Method 500 begins at operation 502 where a natural language expression is received. For example, the natural language expression may be received by both a single-turn model and a multi-turn model of the statistical system for processing to determine the intent and/or ultimate goal of a user of a digital assistant application, for example. In one example, a natural language expression may include phrases, words, and/or terms in the form of a spoken and/or textual language input (e.g., a user query and/or request). In this regard, the natural language expression may be ambiguous and/or have missing information. For example, the natural language expression, "how about tomorrow," is ambiguous when analyzed in isolation.

When a natural language expression is received at the statistical system, flow proceeds to operation 504 where a first prediction is determined using the single-turn model. For example, the single-turn model may include standard spoken language understanding models such as support vector machines, conditional random fields and/or convolutional non-recurrent neural networks for training purposes. In this regard, the single-turn model may be configured to perform domain and intent prediction (e.g., using the support vector machines) and slot tagging (e.g., using conditional random fields). In one aspect, the single-turn model is configured to determine predictions for single-turn scenarios. A single-turn scenario may be a scenario where a spoken language input/natural language expression is processed in isolation during a session. A single-turn scenario may indicate that only information from the currently processed natural language expression is utilized to make a prediction.

When a natural language expression is received at the statistical system, flow proceeds to operation 506 where a second prediction is determined using the multi-turn model. In this regard, the same natural language expression may be received at both the single-turn model and the multi-turn model for processing. In one example, the multi-turn model may include standard spoken or textual language understanding models such as support vector machines, conditional random fields and/or convolutional recurrent neural networks for training purposes. In this regard, the multi-turn model may be configured to perform domain and intent prediction (e.g., using the support vector machines) and slot tagging (e.g., using conditional random fields). In one aspect, the multi-turn model is configured to determine predictions for multi-turn scenarios. For example, a multi-turn scenario may be a scenario where more than one spoken or textual language input/natural language expression is processed during a session between a user and the statistical system and/or where information from each turn of the session is utilized to make a prediction.

At operation 508, the first prediction from the single-turn model and the second prediction from the multi-turn model may be combined to produce a final prediction. For example, after the single-turn model and the multi-turn model determine predictions for the natural language expression, the prediction from each model may be sent to a combination model. In one aspect, the combination model may be configured to assign weights to each of the single-turn model and the multi-turn model and combine the predictions (e.g., the calculated scores) from the single-turn model and the multi-turn model utilizing the assigned weights to produce a final prediction. In one example, the combination model may use linear interpolation to combine the predictions from the single-turn model and the multi-turn model. The weights may be determined and assigned to the single-turn model and the multi-turn model by measuring the accuracy on a development set of data with different weights. In this regard, the weight that generates the highest accuracy is chosen to be the operating point. Alternatively, the weight may be learned from a development set of data in an expectation maximization fashion such that the weight is treated as a hidden variable.

When the final prediction is determined, flow proceeds to operation 510 where an action based on the final prediction is performed. In one aspect, the final prediction may be sent to a final model. In this regard, the final model may be configured to receive final predictions from the combination model and perform an action based on the final prediction. For example, an action may include responding to the natural language expression of a user. The response may include an answer to the natural language expression based on the final prediction of the ultimate goal of the user. For example, if the natural language expression includes a request for driving directions, the action/answer may include providing driving directions to the user based on the final prediction. In another example, the response may include a question to the user. For example, if the natural language query includes a request to create a meeting, the response may be "for what time." In other cases, the action may include performing a task. For example, the action may include creating a calendar event, sending a text message, setting a reminder, performing a query using a search engine (e.g., Bing, Google, Yahoo), and the like.

At decision operation 512, it is determined whether the session between a user and the statistical system has ended. If the session has not ended, flow proceeds to operation 514 where an additional natural language expression is received at the single-turn model and the multi-turn model. The process operations 504, 506, 508, 510, 512, and 514 may continue until the session between the user and the statistical system has ended. As such, a plurality of natural language expressions may be processed by the statistical system. In this regard, when an additional natural language expression (e.g., a second turn of the session) is received by the single-turn model and the multi-turn model, the single-turn model may process the additional natural language expression is isolation and the multi-turn model may process the additional natural language expression using contextual information. The predictions and/or calculated scores from each model are then weighted and combined to produce a final prediction. If the session has ended, flow proceeds to operation 516 where an application (e.g., a digital assistant application) of the statistical system is deactivated. For example, the session may be ended.

Figure 6:
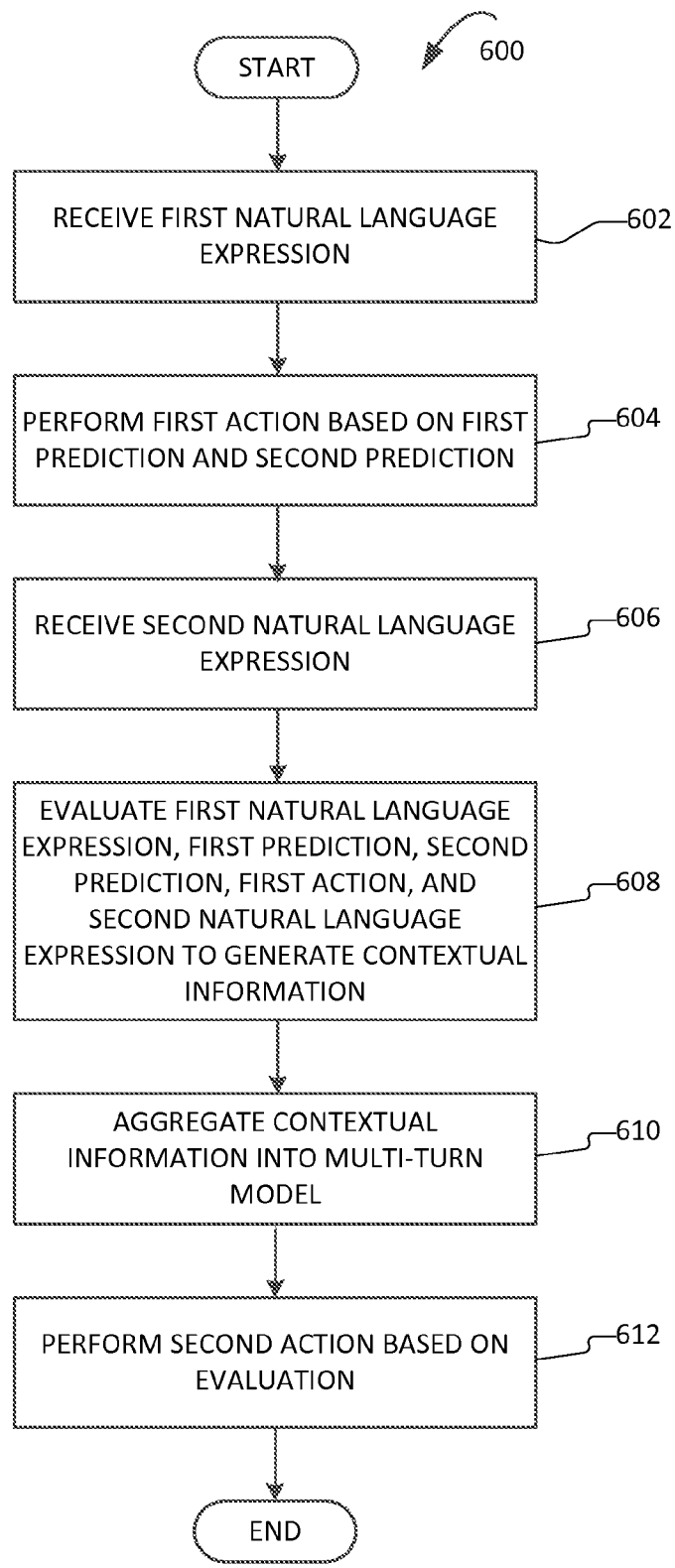
FIG. 6 illustrates an exemplary method for building a statistical model for contextual language understanding, according to an example embodiment.

FIG. 6 illustrates an exemplary method for building a statistical model for contextual language understanding, according to one or more aspects of the present disclosure. Method 600 begins at operation 602 where a first natural language expression is received. For example, the first natural language expression may be received by both a single-turn model and a multi-turn model of the statistical system for processing to determine the intent and/or ultimate goal of a user of a digital assistant application, for example. In one example, a natural language expression may include phrases, words, and/or terms in the form of a spoken or textual language input (e.g., a user query and/or request). In this regard, the natural language expression may be ambiguous and/or have missing information. For example, the natural language expression, "how about tomorrow," is ambiguous when analyzed in isolation.

When the first natural language expression is received, flow proceeds to operation 604 where a first action is performed based on a determined first prediction and a determined second prediction. In one example, an action may include responding to the natural language expression of a user. The response may include an answer to the natural language expression based on a final prediction of the ultimate goal of the user. For example, if the natural language expression includes a request for driving directions, the action/answer may include providing driving directions to the user based on the final prediction. In another example, the response may include a question to the user. For example, if the natural language query includes a request to create a meeting, the response may be "for what time." In other cases, the action may include performing a task. For example, the action may include creating a calendar event, sending a text message, setting a reminder, performing a query using a search engine (e.g., Bing, Google, Yahoo), and the like.

After a first action has been performed, flow proceeds to operation 606 where a second natural language expression is received. For example, the second natural language expression may be received by both a single-turn model and a multi-turn model of the statistical system for processing to determine the intent and/or ultimate goal of a user of a digital assistant application, for example. When the second natural language is received, flow proceeds to operation 608 where the first natural language expression, the first prediction, the second prediction, the first action, and the second natural language expression are evaluated to generate contextual information. For example, domain, intent, and slot type information from the first natural language expression and first and second predictions may be evaluated. In another example, the type of response/action to the first natural language expression based on the first and second predictions may be evaluated. In yet another example, the second natural language expression and the determined predictions for the second natural language expression by the single-turn model and the multi-turn model may be evaluated. In some aspects, any combination of the information described herein may be evaluated to generate contextual information.

When the contextual information is generated based on evaluating the information described herein, flow proceeds to operation 610 where the contextual information is aggregated into the multi-turn model. For example, the multi-turn model may have an initial data set provided by third party sources such as crowdsourcing and/or service logs of an existing rule-based system, for example. As the statistical system processes and evaluates natural language expressions, the statistical system aggregates the data and the generated contextual information from each session into the multi-turn model. In this regard, the multi-turn model may be built over time by processing natural language expressions and generating contextual information that can be built upon and used for processing of future natural language expressions. In turn, the multi-turn model may include a larger data set over time to facilitate a better accuracy rate of determining the intent/goal of a user by the statistical system.

When the contextual information is aggregated, flow proceeds to operation 612 where a second action is performed based on the evaluating operation 608. For example, a second action may include responding to the natural language expression of a user. The response may include an answer to the natural language expression based on the final prediction of the ultimate goal of the user. For example, if the natural language expression includes a request for driving directions, the action/answer may include providing driving directions to the user based on the final prediction. In another example, the response may include a question to the user. For example, if the natural language query includes a request to create a meeting, the response may be "for what time." In other cases, the action may include performing a task. For example, the action may include creating a calendar event, sending a text message, setting a reminder, performing a query using a search engine (e.g., Bing), and the like.

As described herein, the statistical system of the present disclosure may reduce the overall error rate of language understanding systems. One example of a reduced error rate from using the statistical system described herein is illustrated in the table 1.1 below.

TABLE 1.1

| Domain | Error rate of single-turn model | Error rate of combination model |
|---|---|---|
| Places | 13.05 | 9.72 |
| Reminder | 8.18 | 7.16 |
| Calendar | 14.07 | 7.65 |
| Weather | 9.68 | 3.34 |
| Communication | 7.64 | 5.87 |

Table 1.1 shows the error rate reduction for processing 2+ turns of a session. As shown in Table 1.1 a significant improvement in error rate is observed by utilizing the statistical system (e.g., the combination model processing predictions from the single-turn model and the multi-turn model) of the present disclosure. An even more significant improvement is observed for 2+ turn sessions that are ambiguous without contextual information. By utilizing the statistical system of the present disclosure, an improvement in error rate (e.g., an improvement in the accuracy of predicting the intent of a user) may result in a better user experience of the statistical system and/or an application associated with the statistical system (e.g., a digital assistant application). Additionally, a reduction in the error rate may reduce the number of clarifying requests and/or responses the statistical system and/or application has to provide. As such, fewer computations may be required by the client and/or server computing device.

Figure 7:
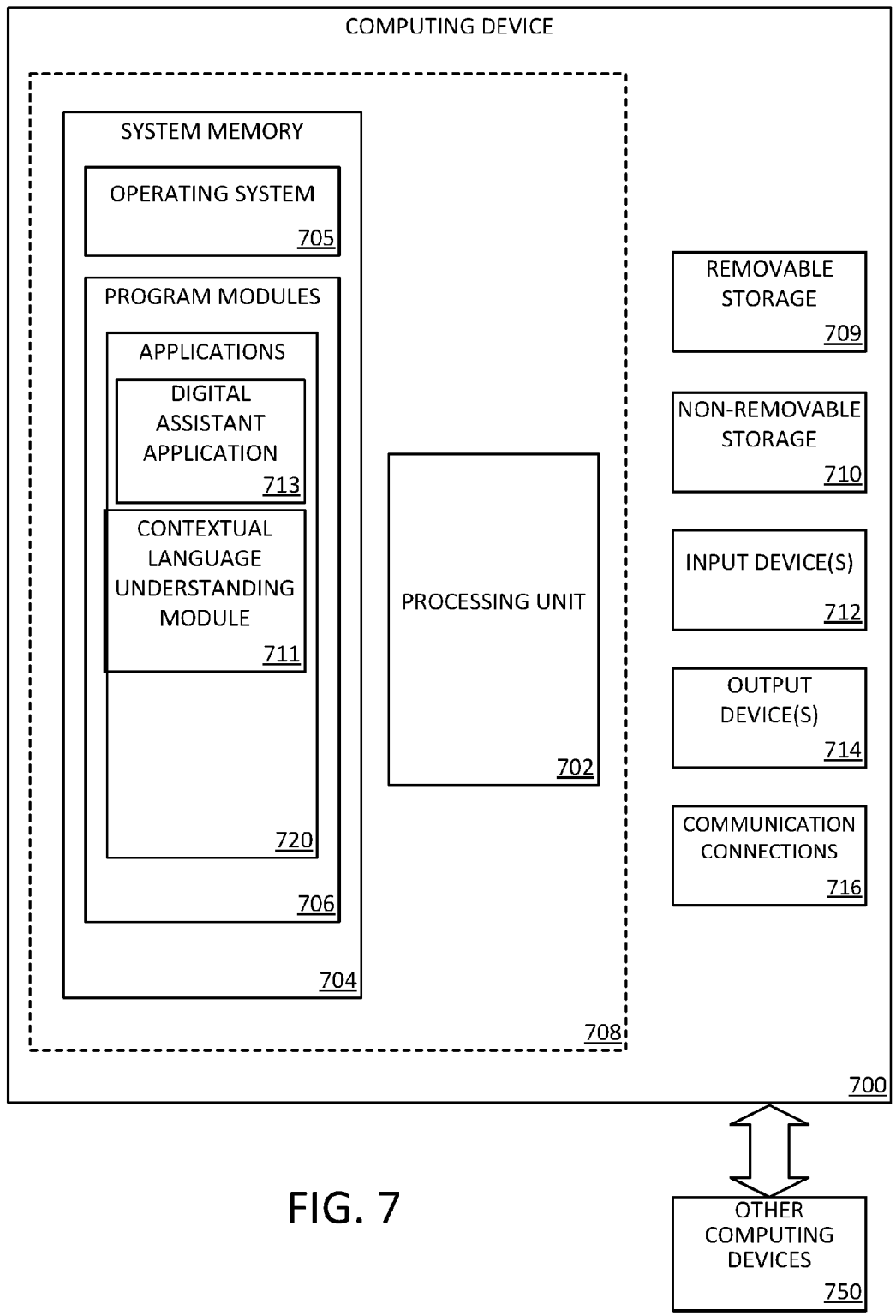
FIG. 7 is a block diagram illustrating example physical components of a computing device with which embodiments of the disclosure may be practiced.

FIGS. 7-10 and the associated descriptions provide a discussion of a variety of operating environments in which aspects of the disclosure may be practiced. However, the devices and systems illustrated and discussed with respect to FIGS. 7-10 are for purposes of example and illustration and are not limiting of a vast number of computing device configurations that may be utilized for practicing embodiments of the disclosure, described herein FIG. 7 is a block diagram illustrating physical components (e.g., hardware) of a computing device 700 with which aspects of the disclosure may be practiced. The computing device components described below may have computer executable instructions for a digital assistant application 713, e.g., of a client and/or computer, executable instructions for contextual language understanding module 711, e.g., of a client, that can be executed to employ the methods 400 through 600 disclosed herein. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 720 such as contextual language understanding applications in regards to FIGS. 1-3 and, in particular, digital assistant application 713 or contextual language understanding module 711. The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., contextual language understanding module 711 or digital assistant application 713) may perform processes including, but not limited to, the aspects, as described herein. Other program modules that may be used in accordance with aspects of the present disclosure, and in particular for contextual language understanding, may include single-turn models, multi-turn models, combination models, final models, and/or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
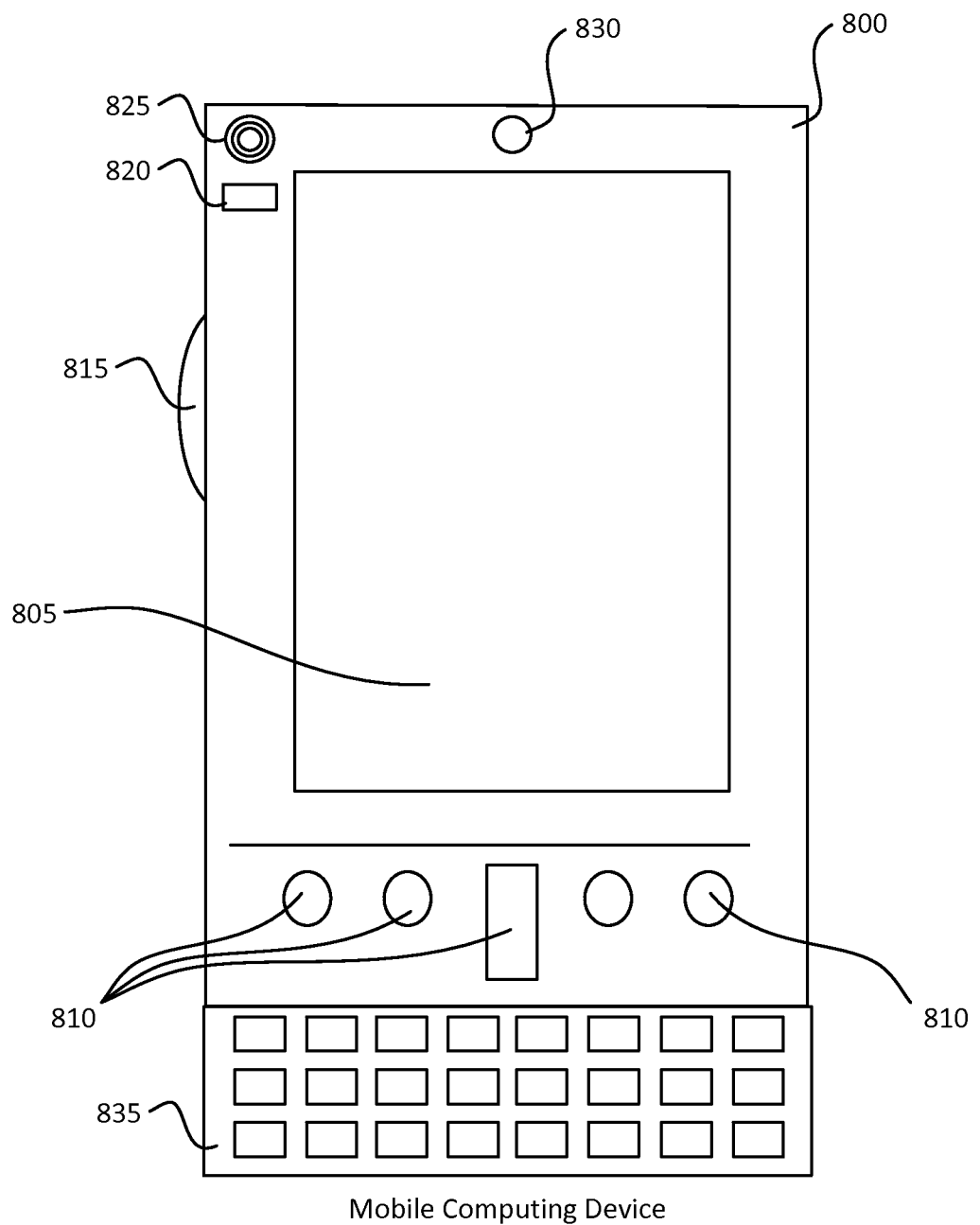
FIGS. 8A and 8B are simplified block diagrams of a mobile computing device with which embodiments of the present disclosure may be practiced.
Figure 8B:
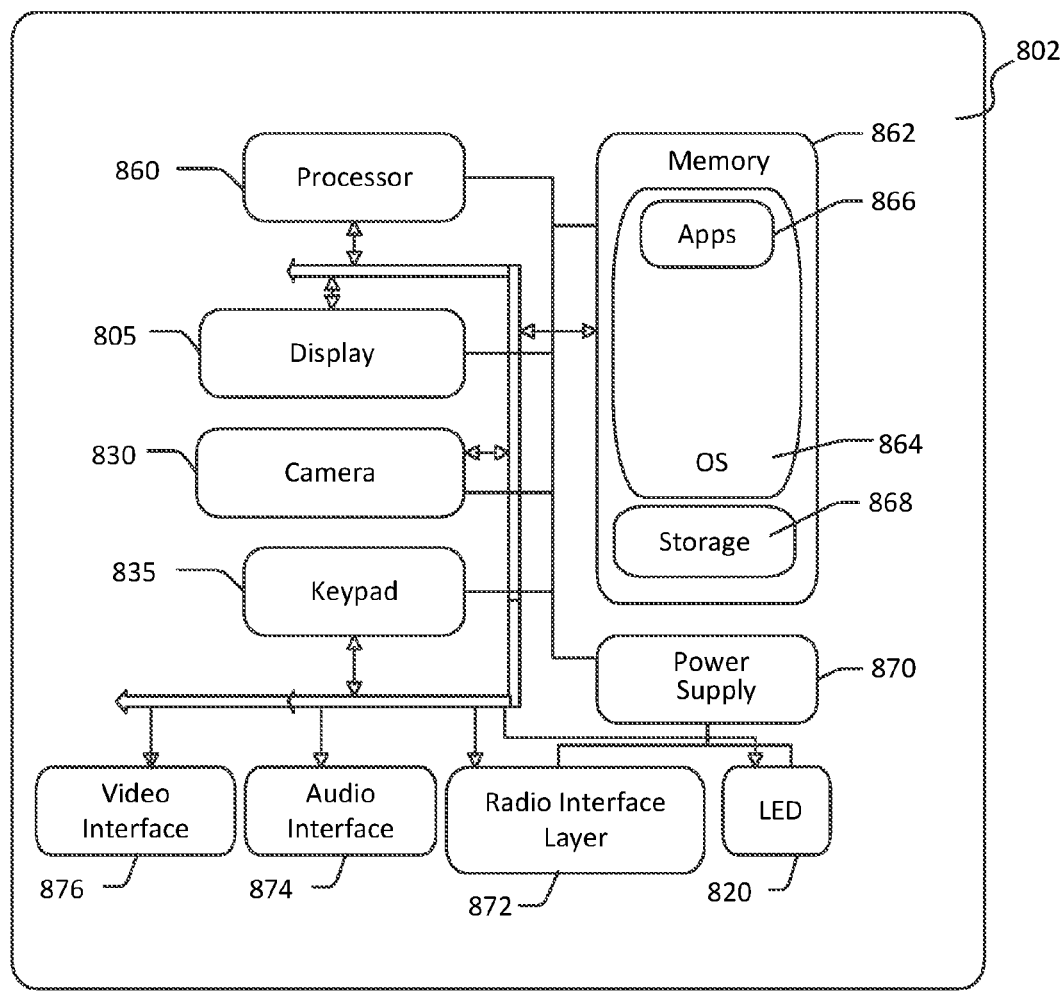

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements.

The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including the instructions to create a calendar event as described herein (e.g., and/or contextual language understanding module 711).

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

Figure 9:
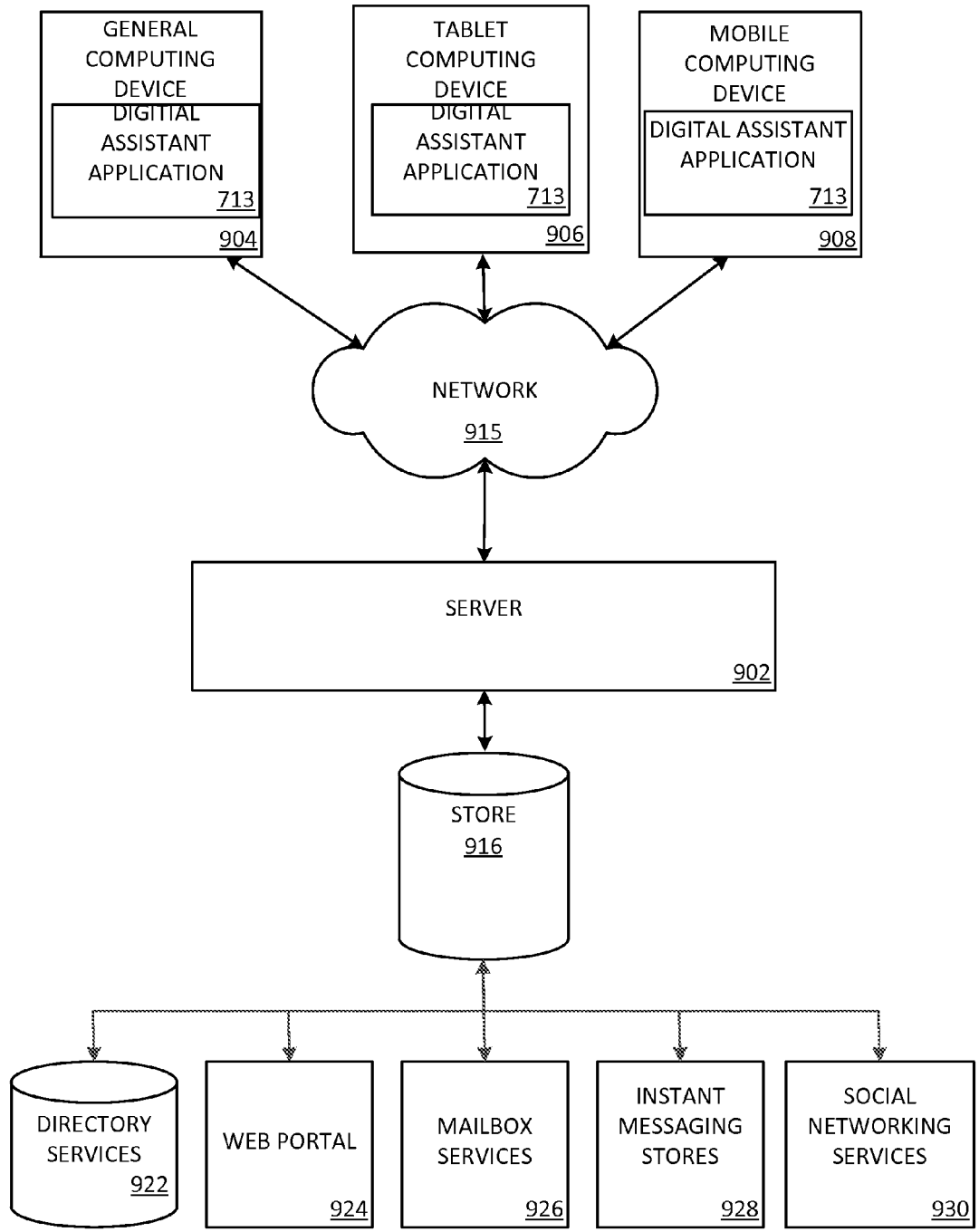
FIG. 9 is a simplified block diagram of a distributed computing system in which embodiments of the present disclosure may be practiced.

FIG. 9 illustrates one aspect of the architecture of a system for processing data received at a computing system from a remote source, such as a computing device 904, tablet 906, or mobile device 908, as described above. Content displayed at server device 902 may be stored in different communication channels or other storage types. For example, various documents may be stored using a directory service 922, a web portal 924, a mailbox service 926, an instant messaging store 928, or a social networking site 930. The digital assistant application 713 may be employed by a client who communicates with server 902. The server 902 may provide data to and from a client computing device such as a personal computer 904, a tablet computing device 906 and/or a mobile computing device 908 (e.g., a smart phone) through a network 915. By way of example, the computer system described above with respect to FIGS. 1-3 may be embodied in a personal computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Figure 10:
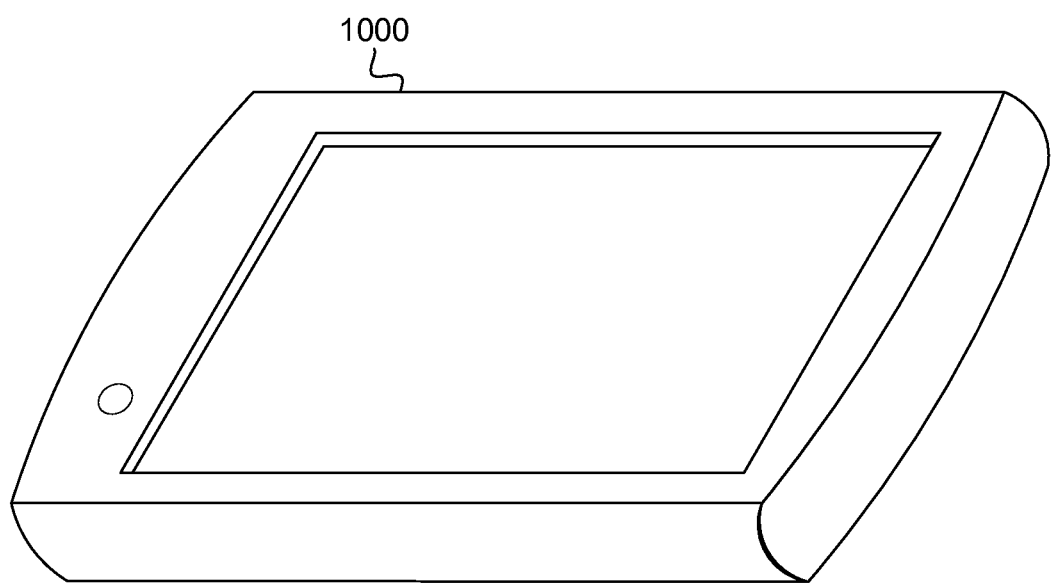
FIG. 10 illustrates a tablet computing device for executing one or more embodiments of the present disclosure.

FIG. 10 illustrates an exemplary tablet computing device 1000 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Among other examples, the present disclosure presents systems for contextual language understanding comprising: receiving at least a first natural language expression and a second natural language expression, wherein the first natural language expression and the second natural language expression include at least one of words, terms, and phrases; determining a first prediction of at least one of a domain classification, intent classification, and slot type of the first natural language expression; determining a second prediction of at least one of a domain classification, intent classification, and slot type of the second natural language expression using at least one of the first natural language expression and contextual information; and performing an action based on the second prediction of the second natural language expression. In further examples, the first prediction and the second prediction are determined using a single model. In further examples, the first prediction is determined using a single-turn model, and wherein the second prediction is determined using a multi-turn model. In further examples, the system further comprises combining the first prediction and the second prediction to produce a final prediction relative to an intent of the second natural language expression. In further examples, the first natural language expression and the second natural language expression are at least one of a spoken language input and a textual input. In further examples, determining the first prediction comprises evaluating the first natural language expression is isolation. In further examples, evaluating the first natural language expression in isolation comprises at least: classifying the first natural language expression into a supported domain of the single model; classifying the first natural language expression into a supported intent of the single model; and extracting at least one semantic word from the first natural language expression and filling at least one supported slot type of the turn model with the at least one semantic word. In further examples, evaluating the second natural language expression using contextual information comprises at least: classifying the second natural language expression into a supported domain of the single model using contextual information; classifying the second natural language expression into a supported intent of the single model using contextual information; and extracting at least one semantic word from the second natural language expression and filling at least one supported slot type of the multi-turn model with the at least one semantic word using contextual information. In further examples, the contextual information includes at least one of information extracted from the first received natural language expression, a response to the first received natural language expression, client context, and knowledge content. In further examples, determining a first prediction comprises calculating a first score indicative of a probability of the first prediction being correct. In further examples, determining a second prediction comprises calculating a second score indicative of a probability of the second prediction being correct. In further examples, combining the first prediction and the second prediction to produce a final prediction comprises: assigning a first weight to the single-turn model; assigning a second weight to the multi-turn model; and combining the first score and the second score utilizing the first assigned weight and the second assigned weight.

Further aspects disclosed herein provide an exemplary system comprising: a statistical model for receiving at least a first natural language expression and a second natural language expression during a conversational session, wherein the at least first and second natural language expressions include at least one of words, terms, and phrases; a single-turn model for determining a first prediction of at least one of a domain classification, intent classification, and slot type of each of the at least first and second natural language expressions; a multi-turn model for determining a second prediction of at least one of a domain classification, intent classification, and slot type of each of the at least first and second natural language expressions; a combination model for combining the first prediction and the second prediction of each of the at least first and second natural language expressions to produce a final prediction relative to an intent of at least the second natural language expression; and a final model for performing an action based on the final prediction of at least the second natural language expression. In further examples, performing an action based on the final prediction comprises responding to the second natural language expression. In further examples, responding to the second natural language expression includes an answer to the second natural language expression based on the final prediction of at least the second natural language expression. In further examples, responding to the second natural language expression includes at least one of asking a question and performing a task. In further examples, determining a first prediction for the at least first and second natural language expressions comprises evaluating the first and second natural language expressions in isolation. In further examples, determining a second prediction for the at least first and second natural language expressions comprises evaluating the first and second natural language expressions using contextual information. In further examples, evaluating the second natural language expression using contextual information comprises evaluating a combination of the first natural language expression, the first prediction for the at least first and second natural language expressions, and the second prediction for the first natural language expression.

Additional aspects disclosed herein provide exemplary systems and methods for building a statistical model for contextual language understanding, comprising: receiving a first natural language expression, wherein the first natural language expression includes at least one of words, terms, and phrases; performing a first action based on a first prediction determined by a single-turn model and a second prediction determined by a multi-turn model; receiving a second natural language expression, wherein the second natural language expression includes at least one of words, terms, and phrases; evaluating at least the first natural language expression, the first action, the first prediction, the second prediction, and the second natural language expression to generate contextual information; aggregating the contextual information into the multi-turn model; and performing a second action based on evaluating at least the first natural language expression, the first action, the first prediction, the second prediction, and the second natural language expression.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   a memory encoding computer executable instructions which, when executed by at least one processor, perform a method for contextual language understanding, comprising:
   receiving at least a first natural language expression and a second natural language expression, wherein each of the first natural language expression and the second natural language expression include at least one of words, terms, and phrases;
   determining, using a single-turn model, a first weighted prediction of at least one of a domain classification, intent classification, and slot type of the first natural language expression;
   determining, using a multi-turn model, a second weighted prediction of at least one of a domain classification, intent classification, and slot type of the second natural language expression using at least one of the first natural language expression and contextual information; and
   performing an action based on the second weighted prediction of the second natural language expression.

2. The system of claim 1, further comprising combining the first weighted prediction and the second weighted prediction to produce a final prediction relative to an intent of the second natural language expression.

3. The system of claim 1, wherein the first natural language expression and the second natural language expression are at least one of a spoken language input and a textual input.

4. The system of claim 1, wherein determining the first weighted prediction comprises evaluating the first natural language expression in isolation.

5. The system of claim 4, wherein evaluating the first natural language expression in isolation comprises at least:
   classifying the first natural language expression into a supported domain of the single-turn model;
   classifying the first natural language expression into a supported intent of the single-turn model; and
   extracting at least one semantic word from the first natural language expression and filling at least one supported slot type of the single-turn model with the at least one semantic word.

6. The system of claim 1, wherein evaluating the second natural language expression using contextual information comprises at least:
   classifying the second natural language expression into a supported domain of the single-turn model using contextual information;
   classifying the second natural language expression into a supported intent of the single-turn model using contextual information; and
   extracting at least one semantic word from the second natural language expression and filling at least one supported slot type of the multi-turn model with the at least one semantic word using contextual information.

7. The system of claim 1, wherein the contextual information includes at least one of information extracted from the first received natural language expression, a response to the first received natural language expression, client context, and knowledge content.

8. The system of claim 1, wherein determining the first weighted prediction comprises calculating a first score indicative of a probability of the first weighted prediction being correct.

9. The system of claim 8, wherein determining the second weighted prediction comprises calculating a second score indicative of a probability of the second weighted prediction being correct.

10. The system of claim 9, wherein combining the first weighted prediction and the second weighted prediction to produce a final prediction comprises combining the first score and the second score.

11. A system comprising:
    a statistical model for receiving at least a first natural language expression and a second natural language expression during a conversational session, wherein each of the first natural language expression and the second natural language expression include at least one of words, terms, and phrases;
- a single-turn model for determining a first prediction of at least one of a domain classification, intent classification, and slot type of each of the first natural language expression and the second natural language expression;
- a multi-turn model for determining a second prediction of at least one of a domain classification, intent classification, and slot type of each of the first natural language expression and the second natural language expression;
- a combination model for combining the first prediction and the second prediction of each of the first natural language expression and the second natural language expression to produce a final prediction relative to an intent of at least the second natural language expression; and
- a final model for performing an action based on the final prediction of at least the second natural language expression.

12. The system of claim 11, wherein performing an action based on the final prediction comprises responding to the second natural language expression.

13. The system of claim 12, wherein responding to the second natural language expression includes an answer to the second natural language expression based on the final prediction of at least the second natural language expression.

14. The system of claim 12, wherein responding to the second natural language expression includes at least one of asking a question and performing a task.

15. The system of claim 11, wherein determining a first prediction for the first natural language expression and the second natural language expression comprises evaluating the first natural language expression and the second natural language expression in isolation.

16. The system of claim 11, wherein determining a second prediction for the first natural language expression and the second natural language expression comprises evaluating the first natural language expression and the second natural language expression using contextual information.

17. The system of claim 16, wherein evaluating the second natural language expression using contextual information comprises evaluating a combination of the first natural language expression, the first prediction for the at least first and second natural language expressions, client context, and knowledge content.

18. One or more computer-readable storage media, having computer-executable instructions which, when executed by at least one processor, perform a method for building a statistical model for contextual language understanding, comprising:
- receiving a first natural language expression, wherein the first natural language expression includes at least one of words, terms, and phrases;
- performing a first action based on a first prediction determined by a single-turn model and a second prediction determined by a multi-turn model;
- receiving a second natural language expression, wherein the second natural language expression includes at least one of words, terms, and phrases;
- evaluating at least the first natural language expression, the first action, the first prediction, the second prediction, and the second natural language expression to generate contextual information;
- aggregating the contextual information into the multi-turn model; and
- performing a second action based on evaluating at least the first natural language expression, the first action, the first prediction, the second prediction, and the second natural language expression.

19. The computer-readable storage media of claim 18, wherein the second action is a response to at least one of the first natural language expression and the second natural language expression.

20. The computer-readable storage media of claim 18, wherein the first natural language expression and the second natural language expression are at least one of a spoken language input and a textual input.

\* \* \* \* \*